United States Patent
Chen (10) Patent No.: US 9,514,115 B2
(45) Date of Patent: Dec. 6, 2016

(54) METHOD FOR CREATING FORM VALIDATION PROGRAM AND CORRESPONDING FORM INTERFACE ACCORDING TO RESULT SET METADATA

(71) Applicant: Shih-Hsin Chen, Kaohsiung (TW)

(72) Inventor: Shih-Hsin Chen, Kaohsiung (TW)

( * ) Notice: Subject to any disclaimer, the term of this patent is extended or adjusted under 35 U.S.C. 154(b) by 137 days.

(21) Appl. No.: 14/587,250

(22) Filed: Dec. 31, 2014

(65) Prior Publication Data

US 2016/0188560 A1    Jun. 30, 2016

(51) Int. Cl.
*G06F 17/24* (2006.01)
*G06F 17/30* (2006.01)

(52) U.S. Cl.
CPC ....... *G06F 17/243* (2013.01); *G06F 17/30893* (2013.01)

(58) Field of Classification Search
CPC .................. G06F 17/243; G06F 17/30893
See application file for complete search history.

(56) References Cited

U.S. PATENT DOCUMENTS

2003/0154197 A1* 8/2003 Millet ............... G06F 17/30595
2011/0238437 A1* 9/2011 Zhou ................... G06F 19/3487
705/2

FOREIGN PATENT DOCUMENTS

TW        507142 B    10/2002

* cited by examiner

*Primary Examiner* — Asher Kells
(74) *Attorney, Agent, or Firm* — Rosenberg, Klein & Lee (57) ABSTRACT

The settings related to form fields now are unable to be set dynamically according to attributes of a table. The settings related to form fields include length of form fields, validation rule of form filed (such as length of input character or whether the input character is a not null parameter, etc.), and presentation of form fields (such as check box or calendar time selection interface). The present invention uses result set metadata of a relational database to get the attributes. Thus a form interface includes form fields corresponding to the attributes. And the presentation of the form fields can be determined by the corresponding attribute parameters. Moreover, whether data format is correct is checked by a form validation program according to data user input into the form field. Thereby development workflow can be simplified and development time can be shortened for web developers and program designers.

5 Claims, 6 Drawing Sheets

| Name | input Content | |
|---|---|---|
| Name* | | required field |
| Email* | | required field |
| Topic* | | required field |
| Content | | |
| Sex | ☐ | |
| CreateDate | | |
| C1* | | required field |
| C2* | | |
| isChecked | ☐ | |

[ transfer ]　[ cancel ]

FIG. 4

| Name | input Content | |
|---|---|---|
| Name* | 012345678901234567890I | the field length is limited to 45 characters |

METHOD FOR CREATING FORM VALIDATION PROGRAM AND CORRESPONDING FORM INTERFACE ACCORDING TO RESULT SET METADATA

BACKGROUND OF THE INVENTION

1. Field of the Invention

The present invention relates to a method for creating a form validation program and a corresponding form interface according to result set metadata, especially to a method for creating a form validation program and a corresponding form interface according to result set metadata that gets attributes by using result set metadata of a relational database. Thus the form fields are presented according to the corresponding attributes. Not only workload of the web page editing system developer during creation of web pages connecting to a database and having dynamic link is reduced. The presentation way of the form field is also set automatically. The web developer doesn't need to write program for each line or each form field to construct the database. And the problem of input data such as loss of a part of data or unable to be written into the table caused by unmatched length of the form field on the front-end to the corresponding column of the table on the back-end can be solved. Therefore the time required for website development is significantly reduced.

2. Descriptions of Related Art

Generally the establishment of the web site of small business is outsourced for higher efficiency and professional standards. However, under the complicated internet environment getting more competitive and having fast changes in goods and services, efficiency and flexibility are key factors in having successful sales. Thus information technology providers should develop and construct an electronic trading platform as soon as possible for electronic business integration and its application. Once each website update is outsourced, not only the cost is increased, the related discussion and communication are also time-consuming.

Moreover, different companies have different requirements for web forms. Web page editing tools available now include Microsoft Front Page Microsoft Visual Studio, Adobe Dreamweaver, etc. For most of us, website editing is usually left to programmers and web developers as it often requires knowledge of computer operation and programming. To edit a web page, each web page is generated by web designers according to data in files available now. Thus conventional website editing is quite time-consuming. Take web form program as an example. Moreover, most people are not trained to use or write HTML. For example, development of web interactive programs generally includes web forms and web services. After creating tables in database, interactive programs able to create, alter, drop and search tables need to be written. Take web form program as an example. The form includes an input interface required for field data input to the table. After the data being sent, a back-end program receives and writes the data into corresponding column of the table. The development process is not only quite complicated but also time-consuming. And the length of the form field on the front-end is unable to match the length of the corresponding column of the table on the back-end. Thus a part of the data input is lost or unable to be written into the table.

While web pages are produced to connect to a database, it is quite complex to generate the dynamic links. Generally, first define rules and commands for passing variables among data of a database. Then links are attached to the data dynamically while searching the data on the web. At the same time, create a web page able to dynamically receive updated data linked and processed. Yet the most commonly used coding or editing tools are lack of corresponding functions. For example, provide rules that define transmission and link. Thus creation, transmission and link are performed according to certain standards. And a code is embedded into the webpage so that a server end the web page located can perform various works according to the parameters received. Thus the above work needs people familiar with web programming language and database to perform program coding and web code editing. Refer to Taiwanese Pat. Pub. No. 507142, modularized real-time conversion of web editing and display system and method of the same by which users can edit and display web pages on internet are disclosed. Web editors or art editors of the companies can download modularized files from a server to create and edit schematic web pages. After completing the web pages, the web pages are uploaded and stored in the server. However, the data input is limited due to the server programs that build website structure. And users are unable to make settings related to the field including the length of the field required, the validation rule of the field and the input message, etc. change dynamically. Thus the web editor needs to write program for each form field. This complicates the development process and increases the development time for web developers and program designers.

In order to overcome shortcomings of the above web program development method, there is a room for improvement and a need to provide a novel method.

SUMMARY OF THE INVENTION

Therefore it is a primary object of the present invention to provide a method for creating a form validation program and a corresponding form interface according to result set metadata, especially to a method that uses field/column name and attributes name provided by result set metadata of a database and programming language to create a form interface and a form validation program required immediately. Thus interactive programs able to create, alter, drop and search data in the database are provided. Thereby developers of the web page editing system no more need to create the web pages connected to the database and having dynamic link. The form interface is generated automatically. The web developer doesn't need to write programs line after line for connecting to the database. The form interface with real-time functions such as access, update, etc. is created in a simple and fast manner.

In order to achieve the above object, a method for creating a form validation program and a corresponding form interface according to result set metadata of the present invention is applied to a web page editing system with a relational database (such as SQL Server, MySQL, DB2 or Oracle, etc.) The method includes a plurality of steps. First create a table in a relational database by a web developer. The table includes at least one attribute data corresponding to a form field. The above attribute data is composed of a field/column name parameter, a field length parameter, a datatype parameter, a primary key parameter, a not null parameter, an unique parameter, a binary parameter, an unsigned parameter, a zero fill parameter, and an auto increment parameter. Then get the attribute data by using result set metadata of the relational database 11 and create a web code file corresponding to the attribute data by a program accessible to the relational database (such as a compiler program and an interpreter program). At last, generate a corresponding dynamic or static form interface and form validation program at the web page editing system by the web code file. The form interface includes a form field corresponding to the attribute data. And the presentation way of the form field is determined according to the corresponding attribute data. By using result set metadata of the relational database to get the attribute data, not only the workload of web page editing system developer during creation of web pages connecting to a database and having dynamic link is reduced. The elements and links of the web page are edited efficiently. Thus the form interface that web users can use conveniently is created. The presentation way of the form field is also set automatically according to parameters of the corresponding attribute data. And the problem of input data such as loss of a part of data or unable to be written into the table caused by unmatched length of the form field on the front-end to the corresponding column of the table on the back-end during conventional web development process can be solved.

Whether the data format user input is correct or not is validated by the form validation program according to ID or e-mail filled into the form field.

A comment data corresponding to the form field appears on a front-end webpage when the form field has a not null parameter. Moreover, the length of the form field is automatically changed according to the field length parameter of the attribute data. The form field can be a single-line text box or a multiple-line text area. A corresponding comment data appears when the number of characters input into the form field is over the field length parameter.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
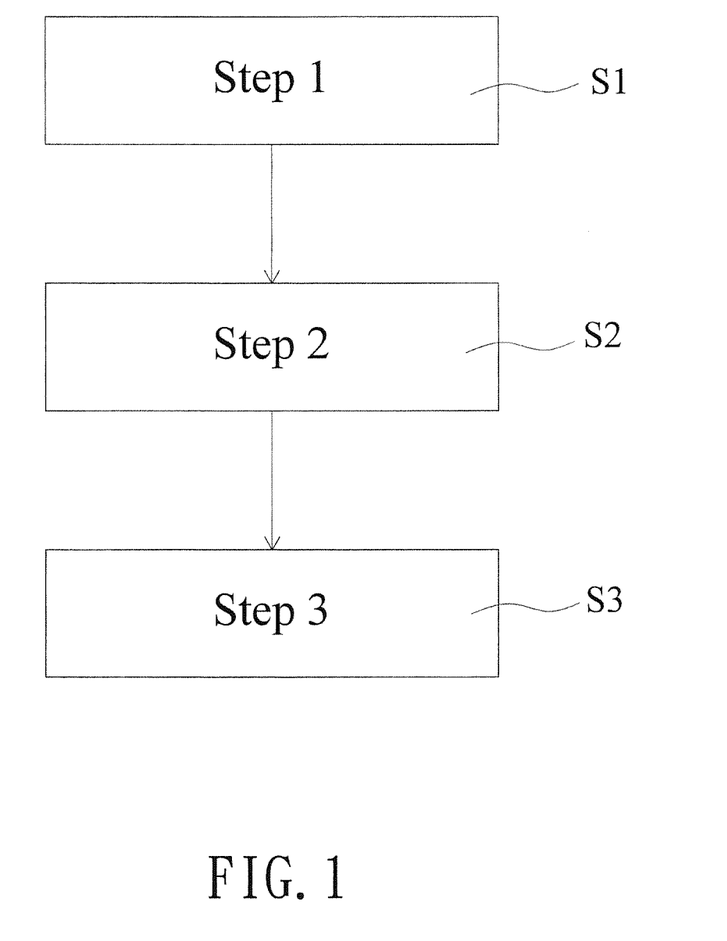
FIG. 1 is a flow chart showing steps of an embodiment of a method for creating a form validation program and a corresponding form interface according to result set metadata according to the present invention.
Figure 2:
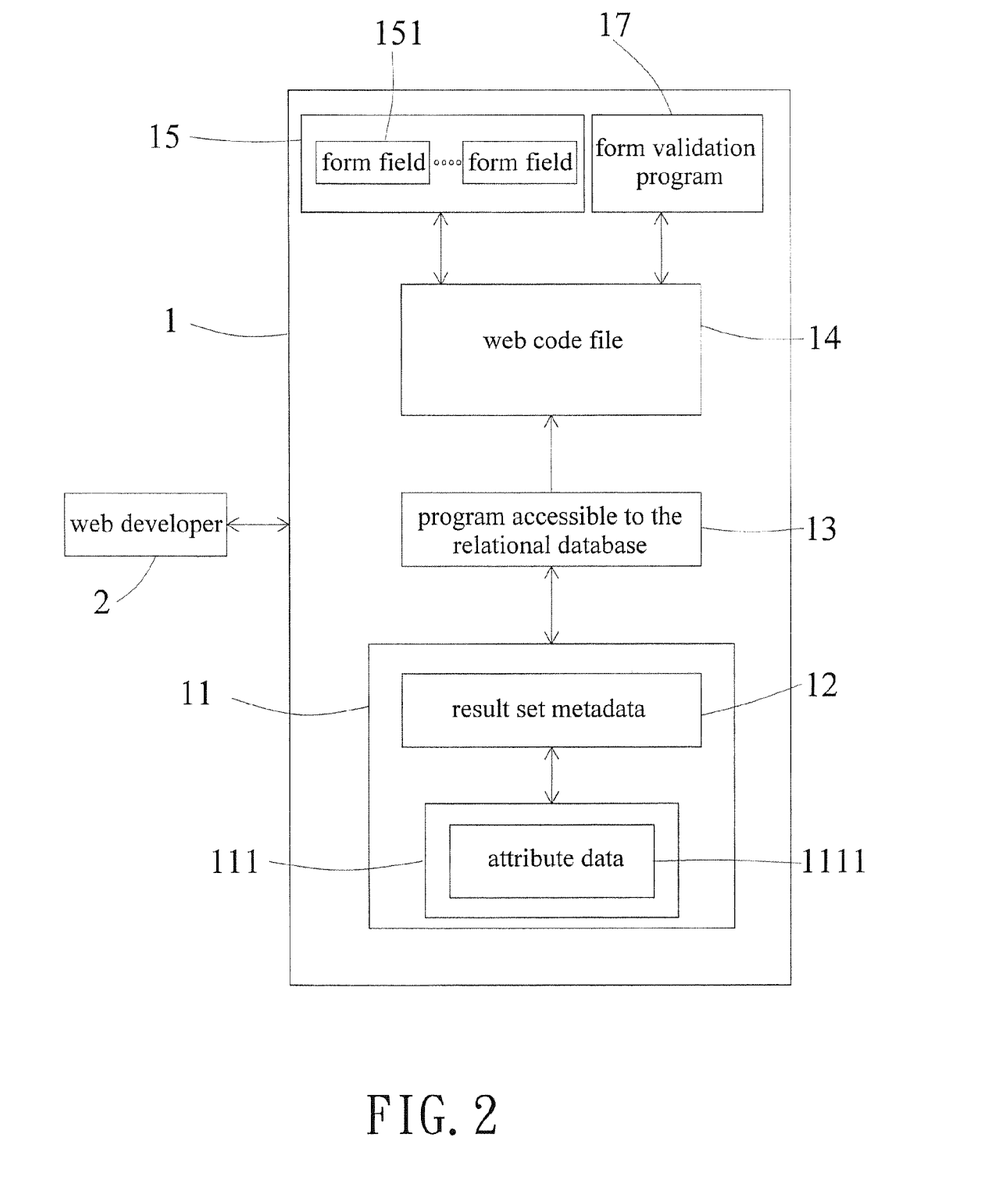
FIG. 2 is a block diagram showing structure of a web page editing system of an embodiment according to the present invention.
Figure 3:
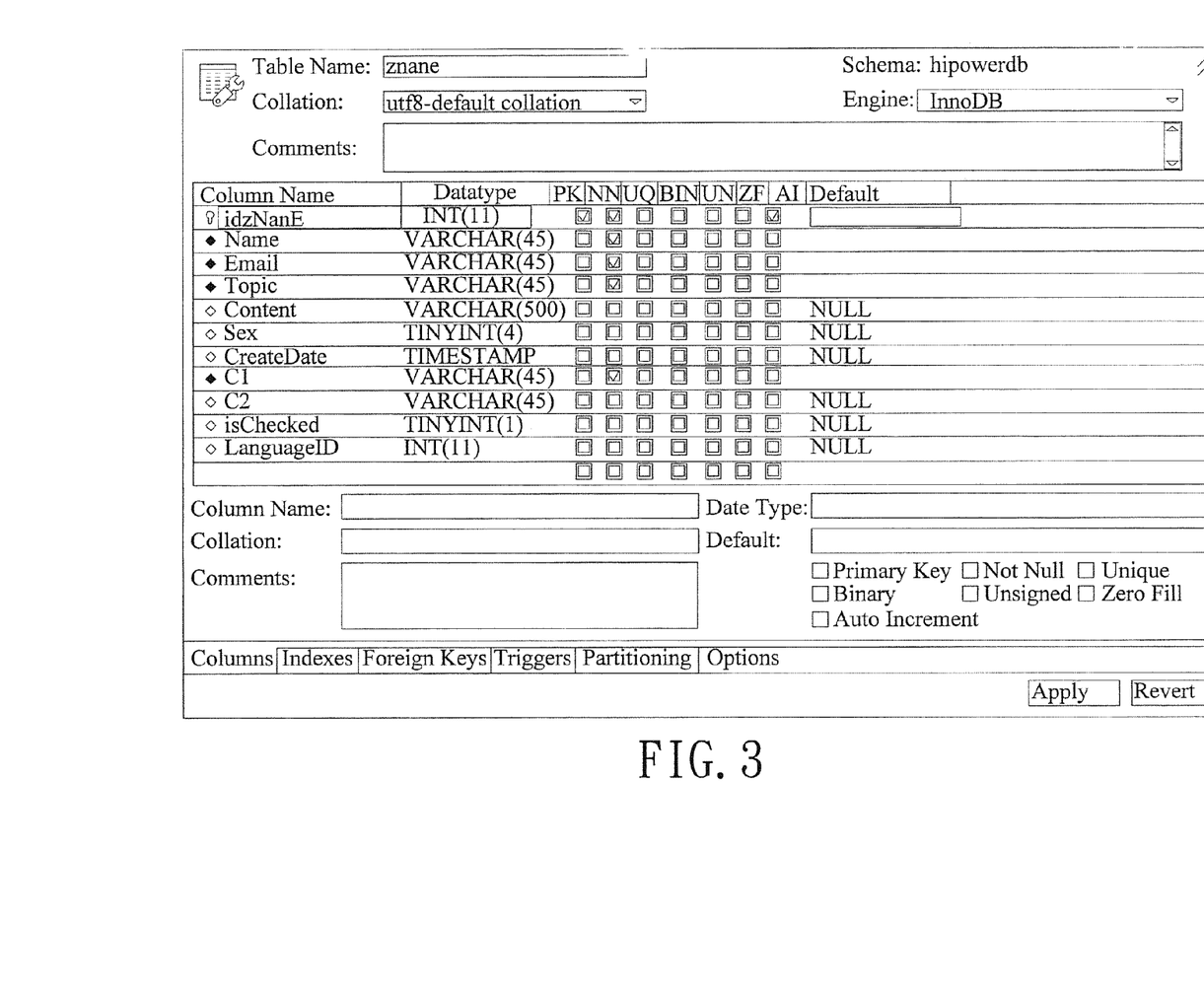
FIG. 3 is a computer created image of an interface of a relational data base of an embodiment according to the present invention.

A method for creating a form validation program and a corresponding form interface according to result set metadata of the present invention is applied to a web page editing system 1 with a relational database 11. The web page editing system 1 can be a conventional web page editing system having web page editing modules. A web developer 2 can select various data in the system and perform editing tasks. Thus data can be shown on the web page in the form of tables, graphs or other patterns by the web page editing system 1. The relational database 11 can be selected from, but not limited to, SQL Server, MySQL, DB2 and Oracle. Refer to FIG. 1 and FIG. 2, a flow chart showing steps of the method and a block diagram of a web page editing system corresponding to the method are disclosed. The method of the present invention has following steps:

Step 1: create a table 111 in a relational database 11 by a web developer 2. The table 111 includes at least one attribute data 1111 corresponding to a form field 151 of a form interface 15. Also refer to FIG. 3 and FIG. 4, a computer created image of an interface of the relational data base of the present invention and a schematic drawing showing a web page of a form interface on the front-end webpage are revealed. Moreover, the above attribute data 1111 consists of a column name parameter, a datatype parameter, a field length parameter (numeric value after datatype), a primary key (PK) parameter, a not null (NN) parameter, an unique (UQ) parameter, a binary (BIN) parameter, an unsigned (UN) parameter, a zero fill (ZF) parameter, and an auto increment (AI) parameter, etc. related to the field/column type. The above Datatype can be an integer, a positive integer up to 255 (TINYINT), character varying (VARCHAR), TIMESTAMP etc. In this embodiment, the column name parameters include idzNanE, Name, Email, Topic, Content, Sex, CreateDate, C1, C2, is Checked and LanguageID. For example, the column name idzNanE has INT datatype, and the field length parameter is 11.

Step 2: get the attribute data 1111 by using result set metadata 12 of the relational database 11 and create a web code file 14 corresponding to the attribute data 1111 by a program 13 accessible to the relational database. The program 13 access to the relational database 11 includes a compiler program and an interpreter program. The compiler program can be, but not limited to, C# language, JAVA language, etc. The interpreter program can be, but not limited to, PHP, JSP, ASP, etc. Moreover, the result set metadata 12 is "Data about Data". The term is used to explain and describe content, format, structure, uses, etc. of digital data. Thus computer system retrieves and processes digital data according to metadata. Thereby the web developer 2 can discover the attribute data 1111 of the relational database 11 (such as Column Name parameter, Datatype parameter, etc.). Furthermore, the result set metadata 12 of the relational database 11 can also be replaced by data in structured documents (such as XML). That means the relational database 11 records and process data into structured documents. Then detailed data of the structured documents is assigned to get the attribute value.

Figure 4:
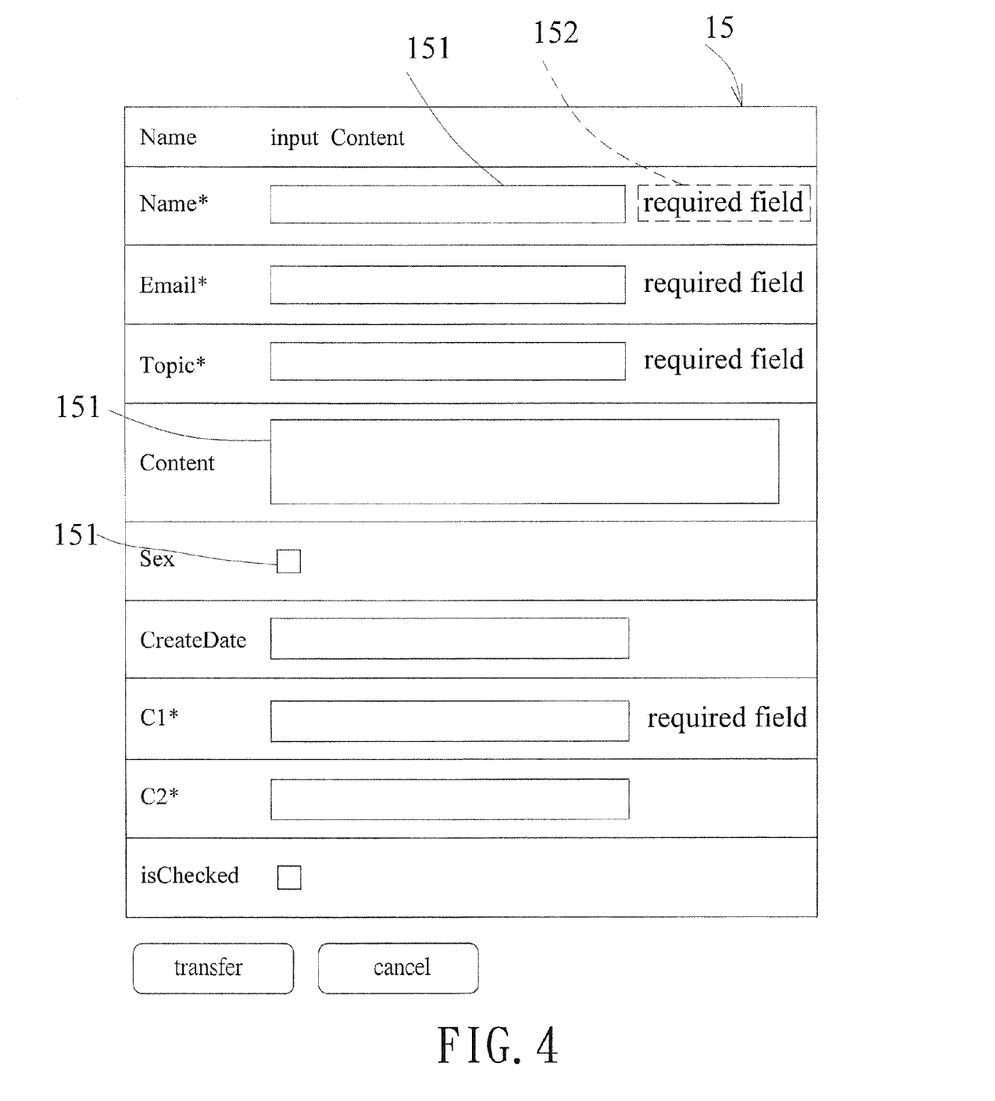
FIG. 4 is a schematic drawing showing a web page of a form interface on front-end of an embodiment according to the present invention.
Figure 5:
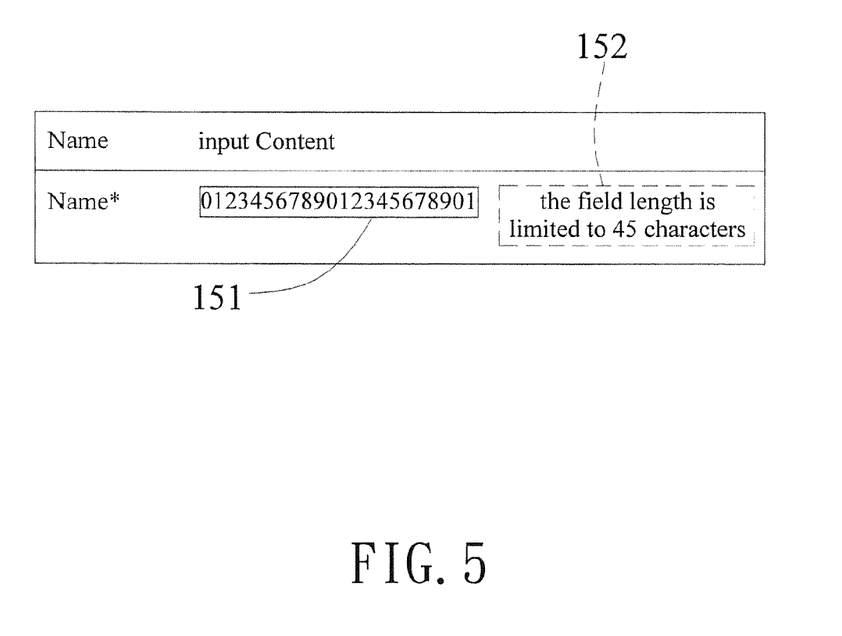
FIG. 5 is a schematic drawing of a web page on front-end while data input doesn't comply with rules of the attribute data of an embodiment according to the present invention.
Figure 6:
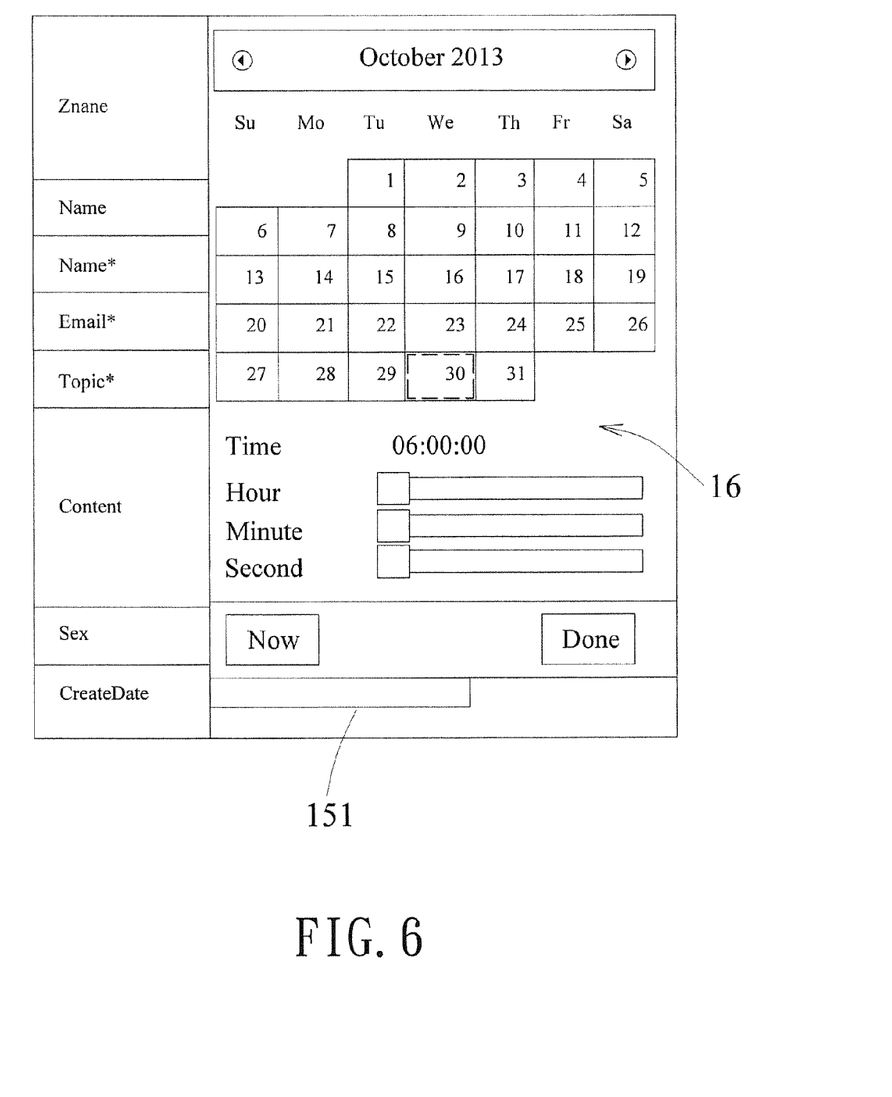
FIG. 6 is a schematic drawing showing a web page of a CreateDate column on front-end of an embodiment according to the present invention.

Step 3: generate a corresponding dynamic or static form interface 15 and a form validation program 17 at the web page editing system 1 by the web code file 14 created at the step 2. Whether the data format is correct is validated by the form validation program 17 according to ID or e-mail filled into the form field 151. The form interface 15 is a program with a user interface or an internet service program (Web Services) without the user interface that provides services to other application programs through Web protocols and standards for data format such as HyperText Transfer Protocol (HTTP), eXtensible Markup Language (XML), Simple Object Access Protocol (SOAP), etc. Thus the application programs are able to communicate well and the applications on different platforms are easy to integrate. In this embodiment, the form interface 15 generated is dynamic. As shown in FIG. 4, the front-end form interface 15 is revealed. It should be noted that the form interface 15 includes the form fields 151 corresponding to the attribute data 1111. The presentation ways of the form fields 151 are determined by parameters of the attribute data 1111. For example, the column name parameter of the Name column has a VARCHAR datatype parameter and the field length parameter is 45. Thus the length of the form fields 151 presented on the front-end webpage is automatically changed to a single-line text box according to the field length parameter of the corresponding attribute data 1111. As to the column name parameter of the Content column has a VARCHAR datatype parameter, the field length parameter is 500. Thus the length of the form fields 151 presented on the front-end webpage is automatically changed to multiple-line text area according to the field length parameter of the corresponding attribute data 1111. Moreover, when the form field 151 has a not null (NN) column name CreateDate has TIMESTAMP datatype. When the user clicks the form field 151 of CreateDate, a monthly calendar-time interface 16 is shown on the front-end form interface 15, as shown in FIG. 6. If the above form fields 151 presented are processed by a conventional way, the programming process is quite complicated when there are a plurality of tables and the form fields 151. Once the user uses the form interface 15 shown in FIG. 4 to do the work, the data input is transferred to another program to be processed. That program firstly receives the data input and connects to the relational database 11, then assigns types of the data input and write the data input into the assigned columns. Thus the whole process has been completed. The code is as following:

```
         Driver          DriverRecordset1          =
(Driver)Class.forName(MM_DRIVER).newInstance( );
         Connection          ConnRecordset1          =
DriverManager.getConnection(MM_STRING,MM_USERNAME,MM_PASSWORD
);
         String      sql      =      "insert      into      znane
(Name,Email,Topic,Content,Sex,CreateDate,C1,C2,isChecked,Language
ID) values ( ? , ? , ? , ? , ? , ? , ? , ? , ? , ? , ?)";
    String Name = request.getParameter("Name");
    String Email = request.getParameter("Email");
    String Topic = request.getParameter("Topic");
    String Content = request.getParameter("Content");
    String Sex = request.getParameter("Sex");
    String CreateDate = request.getParameter("CreateDate");
    String C1 = request.getParameter("C1");
    String C2 = request.getParameter("C2");
    String isChecked = request.getParameter("isChecked");
    String LanguageID = request.getParameter("LanguageID");
    java.util.Date date= new java.util.Date( );
    Timestamp timestamp1 = new Timestamp(date.getTime( ));
    PreparedStatement          preparedStatement1          =
    ConnRecordset1.prepareStatement(sql);
       //Set the data into the prepare statement
    preparedStatement1.setString(1, !Name.equals("") ? Name: "");
    preparedStatement1.setString(2, !Email.equals("") ? Email: "");
    preparedStatement1.setString(3, !Topic.equals("") ? Topic: "");
    preparedStatement1.setString(4, !Content.equals("") ? Content: "");
    preparedStatement1.setInt(5, Sex != null ? 1 : 0);
    preparedStatement1.setTimestamp(6, timestamp1);
    preparedStatement1.setString(7, !C1.equals("") ? C1: "");
    preparedStatement1.setString(8, !C2.equals("") ? C2: "");
    preparedStatement1.setInt(9, isChecked != null ? 1 : 0);
    preparedStatement1.setInt(10,       !LanguageID.equals("")       ?
    Integer.parseInt(LanguageID): 0);
    preparedStatement1.executeUpdate( );
    ConnRecordset1.close( );
``` parameter, a corresponding comment data 152 appears on the front-end webpage. In this embodiment, the fields/columns of Name, Email, Topic and C1 include the not null (NN) parameter. Thus a corresponding comment data 152 "required field" appears on the front-end webpage. If the form field 151 of the table has a Boolean or TintInt datatype, the form field 151 shown on the front-end webpage is automatically changed to a Check Box such as the fields/columns of Sex and is Checked. Furthermore, while the number of characters input into the form field 151 is over the field length parameter, the form field 151 on the front-end webpage shows a corresponding comment data 152. Refer to FIG. 5, when the data input through the form interface doesn't comply with the rule of the attribute data, the web page displayed on the front-end is revealed. The field length of the Name field is 45 characters. Thus when the user input over 45 characters into the Name field, the comment data 152 of "the field length is limited to 45 characters" immediately appears beside the form field 151. Moreover, the Thus the back-end management system can create, alter, drop and search data in the database.

In addition, the method of the present invention can be applied to hardware, software, or their combination. Thus a part of the method can be code (command) mounted in media such as floppy disk drive, compact disk drive, hard disk drive or other machine readable storage medium. When the code is loaded and executed by the machine (such as a computer), the machines becomes a device executing the present invention. While the code being executed by the programmable computer, the computer generally includes a processor, a processor-readable storage medium (having volatile or non-volatile memory and/or storage element), at least one input device and at least one output device.

Compared with the techniques available now, the present invention has following advantages:
1. The present invention gets the attribute data by using result set metadata of the relational database. Not only workload of the web page editing system developer during creation of web pages connecting to a database and having dynamic link is reduced. The elements and links of the web page are edited efficiently. Moreover, the presentation way of the form field is also set automatically. The problem of input data such as loss of a part of data or unable to be written into the table caused by unmatched length of the form field on the front-end to the corresponding column of the table on the back-end during conventional web development process can be solved.

2. The method of the present invention uses simple setting of the attributes to generate a web code file of the form interface quickly and automatically. Thus web developers don't need to write program for each line or each form field hardly for construction of the database. Both source codes of web applications and database with real-time functions such as access, update, etc. are created in the most simple and efficient ways. Thus development workflow can be simplified and development time can be shortened for web developers and program designers, the research and development cost is dramatically reduced and the product competitiveness is improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for creating a form validation program and a corresponding form interface according to result set metadata being applied to a web page editing system with a relational database comprising the steps of:

step 1: creating a table in a relational database by a web developer and the table having at least one attribute data corresponding to a form field; the attribute data having a field/column name parameter, a field length parameter, a datatype parameter, a primary key parameter, a not null parameter, an unique parameter, a binary parameter, an unsigned parameter, a zero fill parameter, and an auto increment parameter;

step 2: getting the attribute data by using result set metadata of the relational database and creating a web code file corresponding to the attribute data by a program accessible to the relational database; and step 3: generating a corresponding dynamic or static form interface and a form validation program at a web page editing system by the web code file; wherein the form interface includes at least one form field corresponding to the attribute data and presentation way of the form field is determined by at least one parameter of the attribute data correspondingly, and a length of the form field is automatically changed according to the field length parameter of the attribute data and the form field is a single-line text box or a multiple-line text area; a comment data correspondingly appears when the number of characters input into the form field is over the field length parameter.

2. The method as claimed in claim 1, wherein the form validation program validates whether data format is correct or not according to ID or e-mail filled into the form field.

3. The method as claimed in claim 1, wherein a comment data corresponding to the form field appears on a front-end webpage when the form field has a not null parameter.

4. The method as claimed in claim 1, wherein the relational database is selected from the group consisting of SQL Server, MySQL, DB2 or Oracle.

5. The method as claimed in claim 1, wherein the program accessible to the relational database includes a compiler program and an interpreter program.

* * * * *